(12) United States Patent
Kun (10) Patent No.: US 10,053,306 B2
(45) Date of Patent: Aug. 21, 2018

(54) APPARATUS AND METHOD FOR INTERMODAL CONTAINER HANDLING

(71) Applicant: SEA-TRAIN EXPRESS—LLC, Federal Way, WA (US)

(72) Inventor: David Kun, Federal Way, WA (US)

(73) Assignee: SEA-TRAIN EXPRESS—LLC, Federal Way, WA (US)

(*) Notice: Subject to any disclaimer, the term of this patent is extended or adjusted under 35 U.S.C. 154(b) by 0 days.

(21) Appl. No.: 15/704,628

(22) Filed: Sep. 14, 2017

(65) Prior Publication Data

US 2018/0016104 A1   Jan. 18, 2018

Related U.S. Application Data

(60) Continuation-in-part of application No. 15/583,583, filed on May 1, 2017, now Pat. No. 9,919,881, which
(Continued)

(51) Int. Cl.
*B65G 63/00* (2006.01)
*B61D 3/00* (2006.01)
(Continued)

(52) U.S. Cl.
CPC ............ *B65G 63/004* (2013.01); *B61D 3/00* (2013.01); *B61D 3/184* (2013.01); *B61D 3/187* (2013.01);
(Continued)

(58) Field of Classification Search
CPC .................................................... B65G 63/004
(Continued)

(56) References Cited

U.S. PATENT DOCUMENTS 2,043,134 A   6/1936   Wanamaker
2,753,811 A   7/1956   Walker
(Continued)

FOREIGN PATENT DOCUMENTS

CN   20133053 Y   10/2009
DE   19610674 A1   7/1997
(Continued)

OTHER PUBLICATIONS

Ligang Zhang, et al, CN201330353 (Y) Oct. 21, 2009—Narrow Gage Cross-Over Switch Device. European Patent Office, Espacenet, Bibliographic data (2 pages).
(Continued)

*Primary Examiner* — Jonathan Snelting
(74) *Attorney, Agent, or Firm* — R. Reams Goodloe, Jr.

(57) ABSTRACT

A ship to railroad intermodal freight system. In an embodiment, a conveyor system is provided for placing railroad cars in a position for loading shipping containers thereon. Railroad cars have a frame with a front end and a rear end, supported between bogies. Conveyor hooks are pivotally mounted to the frame, and a guide roller with hook guide is provided to adjustably support the conveyor hook(s) below the frame of the railroad car. A method for loading or unloading the railroad cars includes lifting a conveyor hook from a drag chain conveyor using the interaction of the guide roller with a pivot board mounted at the chain conveyor, while shipping container(s) are placed on the railroad car. By utilizing the method, efficient loading and unloading of railcars involved in ship to railroad intermodal shipments may save considerable time, and thus reduce costs.

7 Claims, 6 Drawing Sheets

Related U.S. Application Data is a division of application No. 15/144,517, filed on May 2, 2016, now Pat. No. 9,637,327.

(51) Int. Cl.
| | |
|---|---|
| *B65G 19/22* | (2006.01) |
| *B61D 3/18* | (2006.01) |
| *B61D 47/00* | (2006.01) |
| *B65G 63/06* | (2006.01) |

(52) U.S. Cl.
CPC ......... *B61D 47/005* (2013.01); *B65G 19/225* (2013.01); *B65G 63/065* (2013.01); *B65G 2201/0235* (2013.01); *Y02T 30/30* (2013.01)

(58) Field of Classification Search
USPC ............................ 414/333; 104/172.1, 172.2
See application file for complete search history.

(56) References Cited

U.S. PATENT DOCUMENTS

| | | |
|---|---|---|
| 2,826,155 A | 3/1958 | Larsson |
| 2,855,115 A | 10/1958 | Casey |
| 2,920,580 A | 1/1960 | Williams |
| 2,933,053 A | 4/1960 | Mellam |
| 3,012,524 A | 12/1961 | Buisson |
| 3,016,025 A | 1/1962 | Deodat |
| 3,130,688 A | 4/1964 | Gutridge et al. |
| 3,307,722 A | 3/1967 | Godbille |
| 3,442,404 A | 5/1969 | Pioch |
| 3,550,796 A | 12/1970 | Walda |
| 3,640,410 A | 2/1972 | Pioch |
| 3,991,889 A | 11/1976 | Cox |
| 4,124,129 A | 11/1978 | Barry |
| 4,190,393 A | 2/1980 | Landow |
| 4,258,628 A | 3/1981 | Altherr |
| 4,274,776 A | 6/1981 | Paton |
| 4,425,064 A | 1/1984 | Walda et al. |
| 4,459,919 A | 7/1984 | Lemaire et al. |
| 4,480,554 A | 11/1984 | Brodeur et al. |
| 4,599,040 A | 7/1986 | Rasmussen |
| 4,638,740 A | 1/1987 | Rhodes |
| 4,644,869 A | 2/1987 | Rhodes |
| 4,685,399 A | 8/1987 | Baker |
| 4,686,907 A | 8/1987 | Woollam |
| 4,702,174 A * | 10/1987 | Tredwell ................. B61B 10/04 104/172.2 |
| 4,746,257 A | 5/1988 | Barry |
| 4,751,882 A | 6/1988 | Wheatley et al. |
| 4,792,269 A | 12/1988 | Engle |
| 4,817,537 A | 4/1989 | Cripe et al. |
| 4,867,468 A | 9/1989 | Paul et al. |
| 4,917,020 A | 4/1990 | Wicks et al. |
| 4,922,832 A | 5/1990 | Lienard et al. |
| 4,938,151 A | 7/1990 | Viens |
| 5,065,678 A | 11/1991 | Rhodes |
| 5,067,872 A | 11/1991 | Engle |
| 5,216,956 A | 6/1993 | Adams |
| 5,246,321 A | 9/1993 | Hesch |
| 5,249,532 A | 10/1993 | Perrot |
| 5,331,901 A | 7/1994 | Avery |
| 5,341,746 A | 8/1994 | Theurer et al. |
| 5,343,812 A | 9/1994 | Ishida |
| 5,368,152 A | 11/1994 | Rhodes |
| 5,421,687 A | 6/1995 | Wayman |
| 5,473,991 A * | 12/1995 | Crum ................. A47F 10/04 104/172.2 |
| 5,511,923 A | 4/1996 | Dunstan |
| 5,549,050 A | 8/1996 | Rhodes |
| 5,622,115 A | 4/1997 | Ehrich et al. |
| 5,826,517 A | 10/1998 | Larson et al. |
| 5,873,593 A | 2/1999 | Gesuale |
| 5,901,649 A | 5/1999 | Hathaway et al. |
| 5,988,073 A | 11/1999 | Eriksson |
| 6,240,853 B1 | 6/2001 | Kassab |
| 6,309,153 B1 | 10/2001 | Petzitillo, Jr. et al. |
| 6,330,953 B2 | 12/2001 | Summa |
| 6,352,400 B1 | 3/2002 | Forbes |
| 6,736,071 B2 | 5/2004 | Engle |
| 6,968,788 B1 | 11/2005 | Coslovi |
| 7,255,047 B1 | 8/2007 | Coslovi |
| 7,980,582 B2 | 7/2011 | Schuettenberg |
| 8,800,452 B2 | 8/2014 | Kun |
| 9,096,239 B2 | 8/2015 | Kun |
| 9,682,831 B1 | 6/2017 | Kun |
| 2003/0183119 A1 | 10/2003 | Hathaway et al. |
| 2004/0213652 A1 | 10/2004 | Campbell et al. |
| 2006/0260503 A1 | 11/2006 | Jeunehomme et al. |
| 2008/0129827 A1 | 6/2008 | Morino |
| 2008/0141895 A1 | 6/2008 | Lanigan et al. |
| 2008/0166211 A1 | 7/2008 | Lanigan et al. |
| 2008/0213073 A1 | 9/2008 | Benedict et al. |
| 2009/0003985 A1 | 1/2009 | Lanigan, Sr. et al. |
| 2009/0238669 A1 | 9/2009 | Hathaway et al. |
| 2009/0293756 A1 | 12/2009 | Hathaway et al. |
| 2010/0021257 A1 | 1/2010 | Hall et al. |
| 2013/0139719 A1 | 6/2013 | Kun |

FOREIGN PATENT DOCUMENTS

| | | |
|---|---|---|
| EP | 0400052 B1 | 4/1995 |
| EP | 1241118 A2 | 9/2002 |
| EP | 1757508 A2 | 2/2007 |
| GB | 2270663 A | 3/1994 |
| WO | WO 96/37396 | 11/1996 |
| WO | WO 2017/192454 A2 | 11/2017 |

OTHER PUBLICATIONS

Ligang Zhang, et al, CN201330353 (Y) Oct. 21, 2009—Narrow Gage Cross-Over Switch Device. European Patent Office, Patent Translate, Description and Claims (10 pages).

Koelker, Carl Wilhelm; Thiele Bernd; DE19610674 A1. Jul. 17, 1997—Transfer System for Combined Traffic. European Patent Office, Espacenet, Bibliographic data (1 page).

Koelker, Carl Wilhelm; Thiele Bernd; DE19610674 A1. Jul. 7, 1997—Transfer System for Combined Traffic. European Patent Office, Patent Translate, Description and Claims (12 pages).

Marten Hans-F Dipl-Ing. EP1241118 (A2) Sep. 18, 2002—Method and Device for Loading and Unloading Palletized Bulk Goods From Road Vehicles Onto Railway Trains and Vice Versa. European Patent Office, Espacenet, Bibliographic data (2 pages).

Marten Hans-F Dipl-Ing. EP1241118 (A2) Sep. 18, 2002—Method and Device for Loading and Unloading Palletized Bulk Goods From Road Vehicles Onto Railway Trains and Vice Versa. European Patent Office, Patent Translate, Description and Claims (15 pages).

PCT International Search Report (5 pages) and Written Opinion of the International Searching Authority—PCT/US2014/035587 (7 pages) (dated Nov. 8, 2017) ISA—EPO.

* cited by examiner

APPARATUS AND METHOD FOR INTERMODAL CONTAINER HANDLING

RELATED PATENT APPLICATIONS

This application is a continuation-in-part of and claims priority from prior and now pending U.S. patent application Ser. No. 15/583,583, filed May 1, 2017, which was a divisional of and claimed priority under 35 USC § 121 of prior U.S. patent application Ser. No. 15/144,517 filed May 2, 2016, (U.S. Pat. No. 9,637,327 B1, issued on May 2, 2017), entitled METHOD AND APPARATUS FOR INTERMODAL CONTAINER HANDLING. The disclosures of the just noted prior related patent applications are incorporated herein in their entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to a method for simply and efficiently transferring containers, including unloading containers from ships and placing the same on railroad cars, or vice versa, and to apparatus which may be employed to facilitate such transfers.

BACKGROUND

In the freight shipping business, it is well known that in many situations, the transfer of containers from ship to rail, or vice versa, may involve extra manpower and lost time while containers are first transferred to short haul highway type trailers, and thence to a nearby rail yard for organization, reloading, and connection of long haul intercity trains. Moreover, the loading of containers on to short haul capable trailers, and thence the reloading of the containers to railroad cars at nearby rail yard (and the reverse process for reloading containers on to ships), is a rather labor intensive and time consuming activity. For example, highway capable trailers are often driven alongside of ships to a position for receiving a container from the ship. Then, the highway trailers may be moved to nearby rail yard, where a switch engine may be used to position rail cars to a loading platform accessible to tractors for the trucks and the highway trailers on which the container was placed. As a result, the use of rail-to-road intermodal system methods have largely been limited to rather long distance freight hauls. However, in an ever more competitive shipping cost environment, there remains a need for improvements which would provide cost savings, and in particular, labor hour savings. More particularly, direct loading of railroad cars from ships might completely avoid the need for short haul truck drivers for large numbers of tractor-trailer combinations. Thus, the provision and use of a new ship-to-railroad intermodal system would be desirable. Thus, it would be advantageous if novel, cost effective methods were available, along with novel apparatus for implementation of such methods, for improving economics of ship-to-railroad freight transfer.

BRIEF DESCRIPTION OF THE DRAWING FIGURES

The present invention will be described by way of exemplary embodiments, illustrated in the accompanying drawing figures in which like reference numerals denote like elements, and in which.

ad trailer by a tractor, with the L-car in its lowered, trailer pickup position.

The foregoing figures, being merely exemplary, contain various elements that may be present or omitted from apparatus that may be used to practice the methods taught herein. An attempt has been made to draw the figures in a way that illustrates at least those elements that are significant for an understanding of the apparatus and methods taught herein, and for the alternate configurations thereof. However, various other elements for conveyor systems, and intermodal freight system components and methods of use thereof, may be utilized, within the teachings hereof and within the coverage of the claims set forth herein.

DETAILED DESCRIPTION

Unique equipment and methods for use of such equipment in ship-to-railroad (and vice versa) intermodal freight systems are set forth herein. Some of the equipment useful in carrying out the method(s) described herein was previously described in above referenced patent applications. The illustrations provided in this disclosure are directed at embodiments utilizing the most common, standard shipping container designs seen in international shipping. However, it should be understood that equipment and methods described herein may be applied to other types of loads to be placed on to railroad cars, and thus the intermodal system design described herein should not be limited to ship-to-railroad cars per se, but should be understood to be useful in the quick loading and unloading of various loads to and from railroad cars. Further, reference will be made herein to "standard shipping containers" which are shipping containers designed and build for intermodal freight transport—from ship to rail to truck—while the cargo remains therein. While there are many types and a number of "standardized sizes"—in which the most common sizes are either twenty feet or forty feet in length, and are eight feet wide, and eight feet six inches tall. Although those of skill in the art will understand such usage, for further explanation, the reader is referred to the explanation of various types of intermodal shipping containers as may be found on Wikipedia, at the following link: https://en.wikipedia.org/wiki/Intermodal container.

Figure 1:
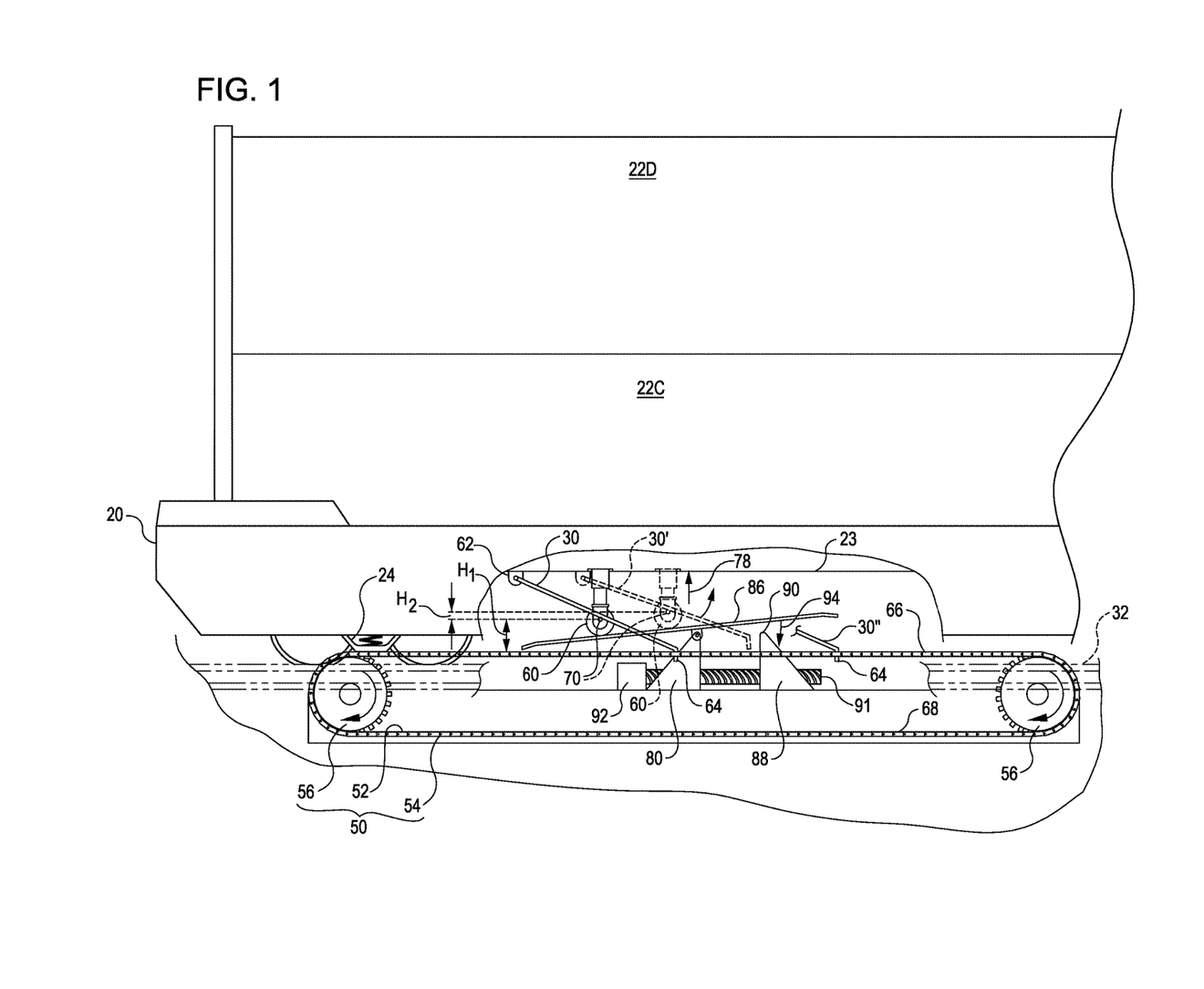
FIG. 1 shows a portion of a "well" type railroad car to which an extensible guide roller and conveyor hook have been added, while those novel components interact with a drag chain conveyor that utilizes a pivot, a pivot board, and pivot stop with actuator, to receive the railroad car and halt its forward motion long enough to enable a crane operator to remove a shipping container from a ship and place the shipping container on the railroad car.
Figure 3:
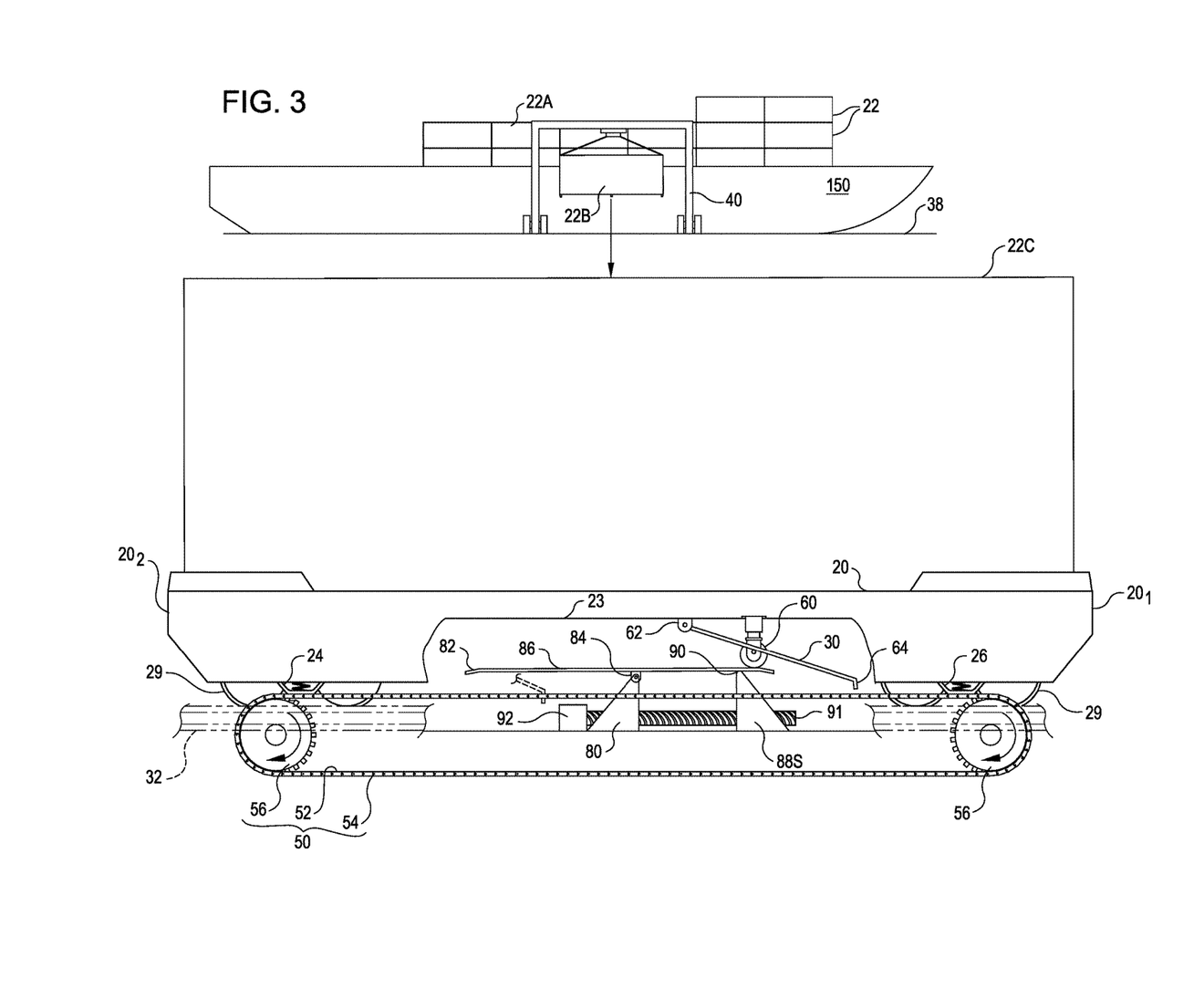
FIG. 3 depicts a conveyor system and accompanying railroad siding which may be placed along a wharf for transfer of shipping containers from a ship via a crane to a railroad car. In this view it is seen that the guide roller on the railroad car supports the conveyor hook to raise the same above the drag chain, thus allowing the railroad car to stop for loading (or unloading), since the forward movement of the railroad car has ceased due to disengagement of the conveyor hook from the drag chain, and thus the railroad car stays in place until movement of the pivot stop toward the pivot allows reengagement of the conveyor hook with the drag chain.
Figure 4:
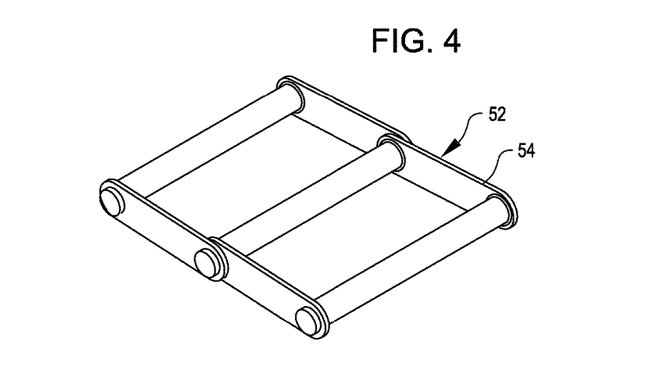
FIG. 4 shows an exemplary embodiment for drag chain elements for use in a conveyor system which may be placed at a wharf for movement of railroad cars for loading of containers from a ship to a railroad car.
Figure 6:
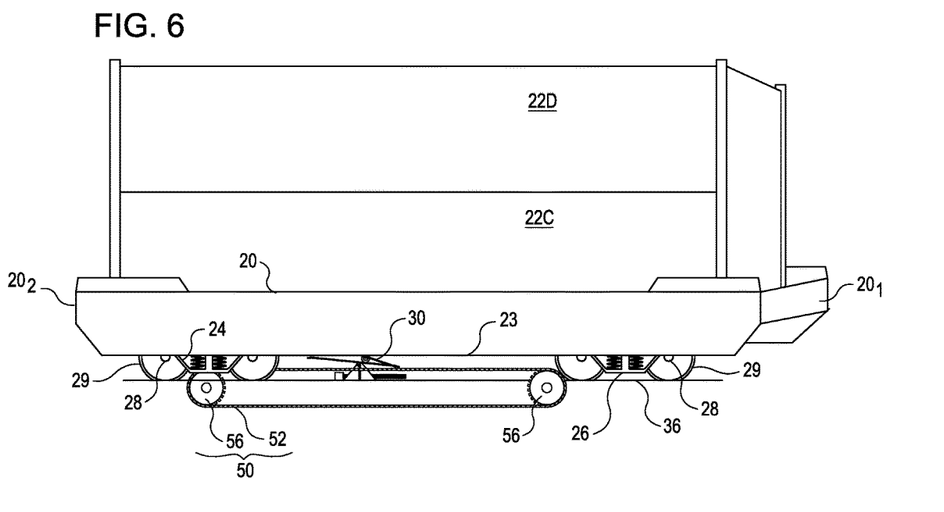
FIG. 6 shows a railroad car on which two shipping containers have been loaded, and shows the conveyor hook re-engaged with the drag chain after loading has been completed, in order to move the railroad car onward out of the loading position on a railroad siding which includes a drag chain conveyor apparatus.

Attention is directed to FIGS. 1, 3, and 6, where a railroad car 20 for carriage of shipping containers 22 (shown in FIGS. 1 and 6 as shipping containers 22C and 22D) is depicted. As seen in FIG. 6, a railroad car 20 having a frame 23 riding between a first bogie 24 and a second bogie 26 may be provided. In an embodiment, the first bogie 24 and second bogie 26 may each include a chassis operably supporting wheelsets including a pair of axles 28, with each axle 28 provided with a pair of flanged rail wheels 29. The bogies 24 and 26 may be provided in any of a number of configurations known to those of skill in the art.

The railroad car 20, as depicted in FIGS. 1 and 6, is being pulled by a first conveyor hook 30 along companion spaced apart first rail 32 and second rail 34 which together provide a railroad siding 36. As shown in FIG. 3, a railroad siding 36 may be provided on a wharf 38, adjacent a ship 150 having shipping containers 22 thereon. A crane 40 may be provided for unloading containers 22A from ship 150, (shown as container 22B while being positioned by the crane 40), or for loading containers 22C and 22D (shown on railroad car 20) to the ship 150. As shown in FIG. 1, a second container 22D may be loaded to railroad car 20, when railroad car 20 is of the "well" or "lowboy" type that allows a pair (e.g. 22C and 22D) of shipping containers 22 to be vertically loaded and still provide adequate clearance for railroad operation.

Figure 2:
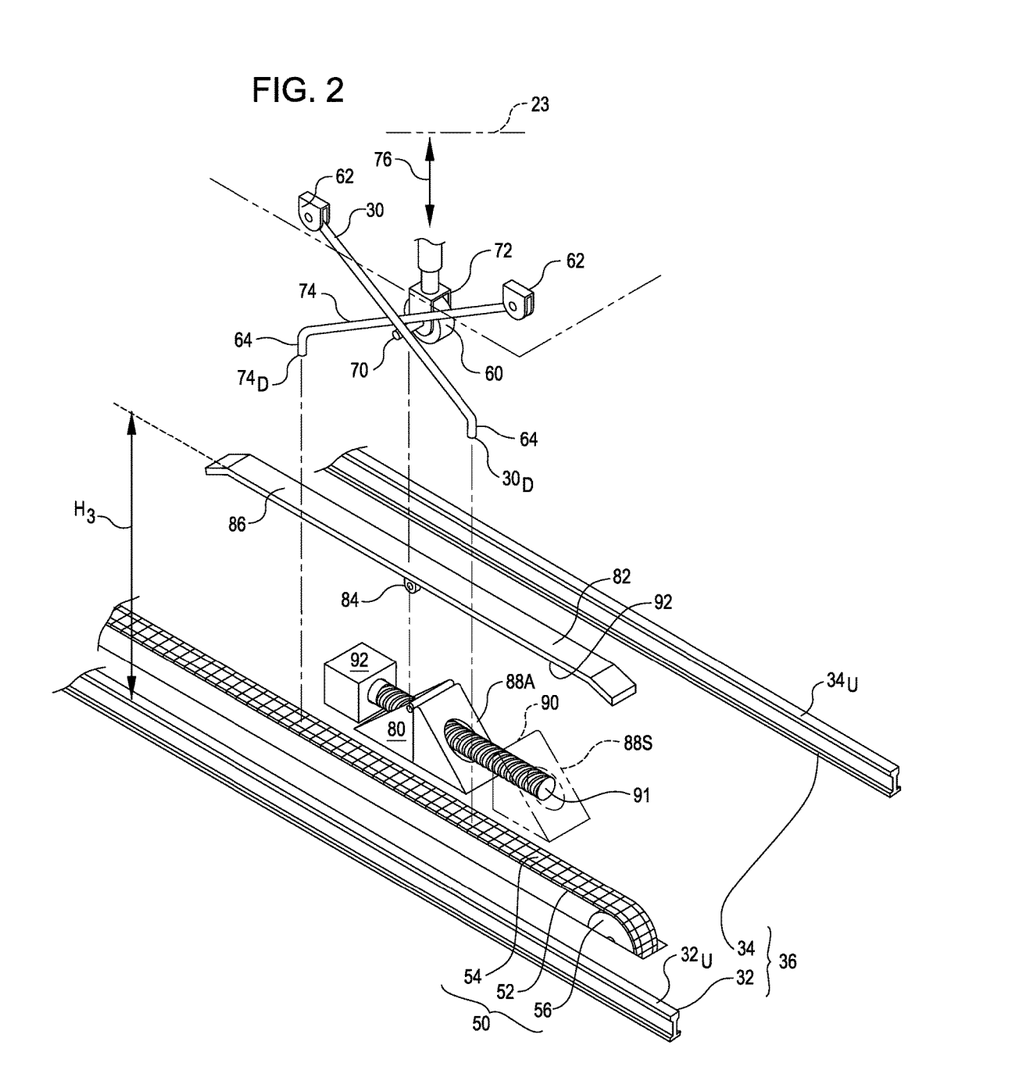
FIG. 2 shows yet further details for an embodiment for apparatus added to a railroad car for use in loading and unloading shipping containers, namely a pair of conveyor hooks mounted in crossing "X" configuration, with the bottom of the X supported by an outwardly extending support on an extensible guide roller that is located to traverse a pivot board which is in turn supported between a pair of rails by a pivot and pivot stop, which is located adjacent a longitudinally extending drag chain conveyor.

As seen in FIGS. 1 and 2, a conveyor system 50 having a drag chain 52 with links 54 with one or more drive wheels 56 is provided. In an embodiment, the drag chain 52 may be disposed between rails 32 and 34. As further seen in FIG. 1, a frame 23 is provided for railroad car 20, wherein the frame 23 further includes, mounted for downwardly extending operation, an extensible/retractable guide roller 60. Also, pivotally mounted at hook mount 62 for angular extension below frame 23 is a first conveyor hook 30. When the extensible/retractable guide roller 60 is in a normal, downward, uncompressed (extended) condition, the first conveyor hook 30 has a hook end 64 that is sufficiently angularly downwardly disposed so that the hook end 64 of conveyor hook 60 extends below the frame 23 of the railroad car 20 and is thus positioned in interfitting engagement with one of the plurality of links 54 in the upper portion 66 of the drag chain 52. The links 54 are sized and shaped for receiving therein the hook end 64 of first conveyor hook 30. The drag chain 52 returns via endless belt along lower portion 68 of the drag chain 52 to a first drive wheel 56. At the lowered position, the hook end 64 first conveyor hook 30 engages the upper portion 66 of the moving drag chain 52 which is oriented substantially collinear with and between the pair of spaced apart rails 32 and 34, and the railroad car 20 is thereby pulled along.

As better seen in FIG. 2, in an embodiment, the guide roller 60 may include an outwardly projecting hook guide 70. In an embodiment, the hook guide 70 may be in the form of a horizontally extending cylinder affixed to a housing 72 for the guide roller 60. In such an embodiment, the first conveyor hook 30 and second conveyor hook 74 may be arranged in an opposing configuration, that is in a cross-cross, or "X" shaped configuration, with the bottom of the X supporting both first conveyor hook 30 and the second conveyor hook 74 via way of the hook guide 70. In this fashion, as seen in FIG. 2, the extensible/retractable guide roller 60 moves up and down from frame 23 as indicated by reference arrow 76. Such movement is further explained in FIG. 1, where at the fully extended, normal location, guide roller 60 is located a distance $H_1$ above the upper portion 66 of the drag chain 52. Then, when the guide roller is urged upward as indicated by reference arrow 78 to the position shown in broken lines in FIG. 1, the guide roller is raised a distance $H_2$, and by way of the hook guide 70, also raises the conveyor hook 30 upward, to a point where the conveyor hook 30 disengages the drag chain 52, as indicated by broken lines of conveyor hook 30'.

Figure 7:
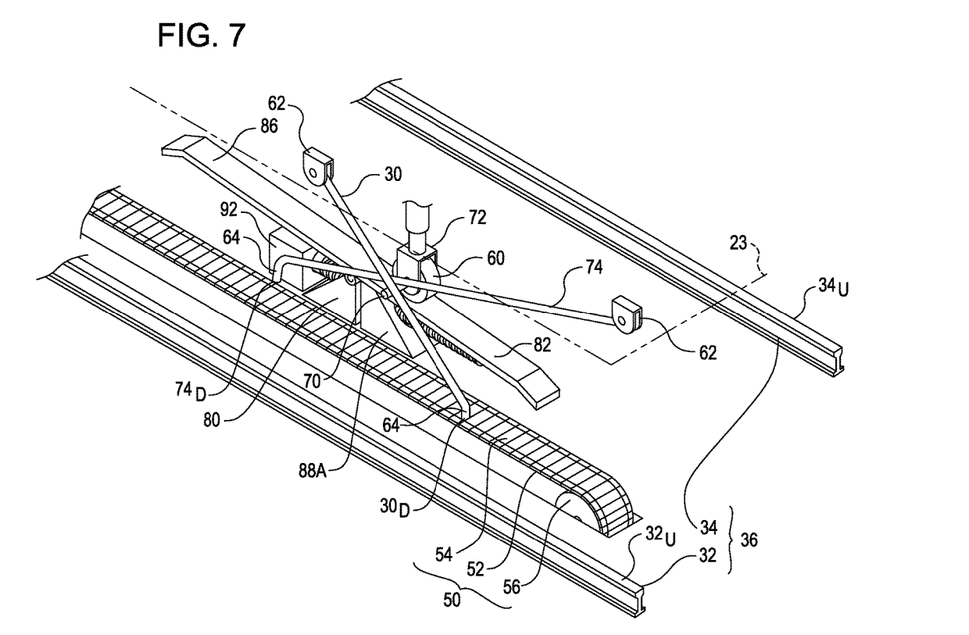
FIG. 7 shows a portion of a conveyor system and accompanying railroad siding which may be placed along a wharf for transfer of containers from a ship to a railroad car, showing a conveyor hook extending from the railroad car and which has been lowered by downward movement of the guide roller on the pivot board, so that the conveyor hook has reengaged the drag chain, and thus would be pulling the railroad car (not shown other than by partial broken line) forward.

Turning now to FIG. 2, the components for stopping and starting a railroad car 20 for loading and unloading of shipping containers 22 thereon are detailed. A pivot 80 is provided, and a pivot board 82 is pivotally mounted thereto at pivot pin 84. In an embodiment, the pivot 80 may be fixed in location. The pivot board 82 is oriented along and between the pair of spaced apart rails 32 and 34. The pivot board 82 includes an upper surface 86 adapted for rolling engagement with the extensible guide roller 60. A movable pivot stop 88 is provided. The moveable pivot stop 88 can be positioned to and from a pivot board engaging position (as shown in FIGS. 1 and 3) and a pivot board avoidance position (as shown in FIGS. 2, 6, and 7). In FIG. 2, the pivot board avoidance position is indicated as 88A, and the pivot board stop position is indicated as 88S (shown in broken lines). The pivot stop 88 includes an upper end 90 adapted to receive a lower side 92 of the pivot board 82, to thereby stop pivotal movement of the pivot board 82 when the pivot stop 88 is in the pivot board 82 engaging position (88S in FIG. 2).

As further seen in FIG. 2, the moveable pivot stop 88 can be moved by a pivot stop positioner 91. The pivot stop positioner 91 may be adapted to move the pivot stop 88 between the pivot board engaging position (88S) and the pivot board avoidance (88A) position. In an embodiment, the pivot stop positioner 91 may be provided in the form of a screw actuator, with a prime mover 92 (such as electric or hydraulic motor), wherein the pivot stop positioner 91 (e.g., screw actuator) moves the pivot stop 88 back and forth in a direction substantially parallel to the pair of spaced apart rails 32 and 34.

In an embodiment, the pivot board 82 may be pivotally mounted at a height $H_3$ above the upper surface $32_U$ and $34_U$ of the pair of rails 36, wherein the height $H_3$ is sufficient to cause the pivot board 82 to engage and upwardly urge the extensible guide roller 60 of the railroad car 20, as the railroad car 20 is advanced toward the pivot 80 by the drag conveyor system 50. Also as indicated in FIG. 1, in an embodiment the pivot stop 88 is located to receive and stop downward pivotal motion (indicated by reference arrow 94) of the pivot board 82, so that when the guide roller 60 is raised to the position shown in broke lines in FIG. 1, the conveyor hook 30 is raised sufficiently to disengage the conveyor hook 30 from the drag chain 52 of the conveyor system 50, to the position indicated in broken lines as hook 30', so as to stop further movement of the railroad car 20 by way of the conveyor system 50. When the conveyor hook 30 is again lowered to position indicated in FIG. 1 by partial hook 30", the movement of railcar 20 resumes.

Figure 5:
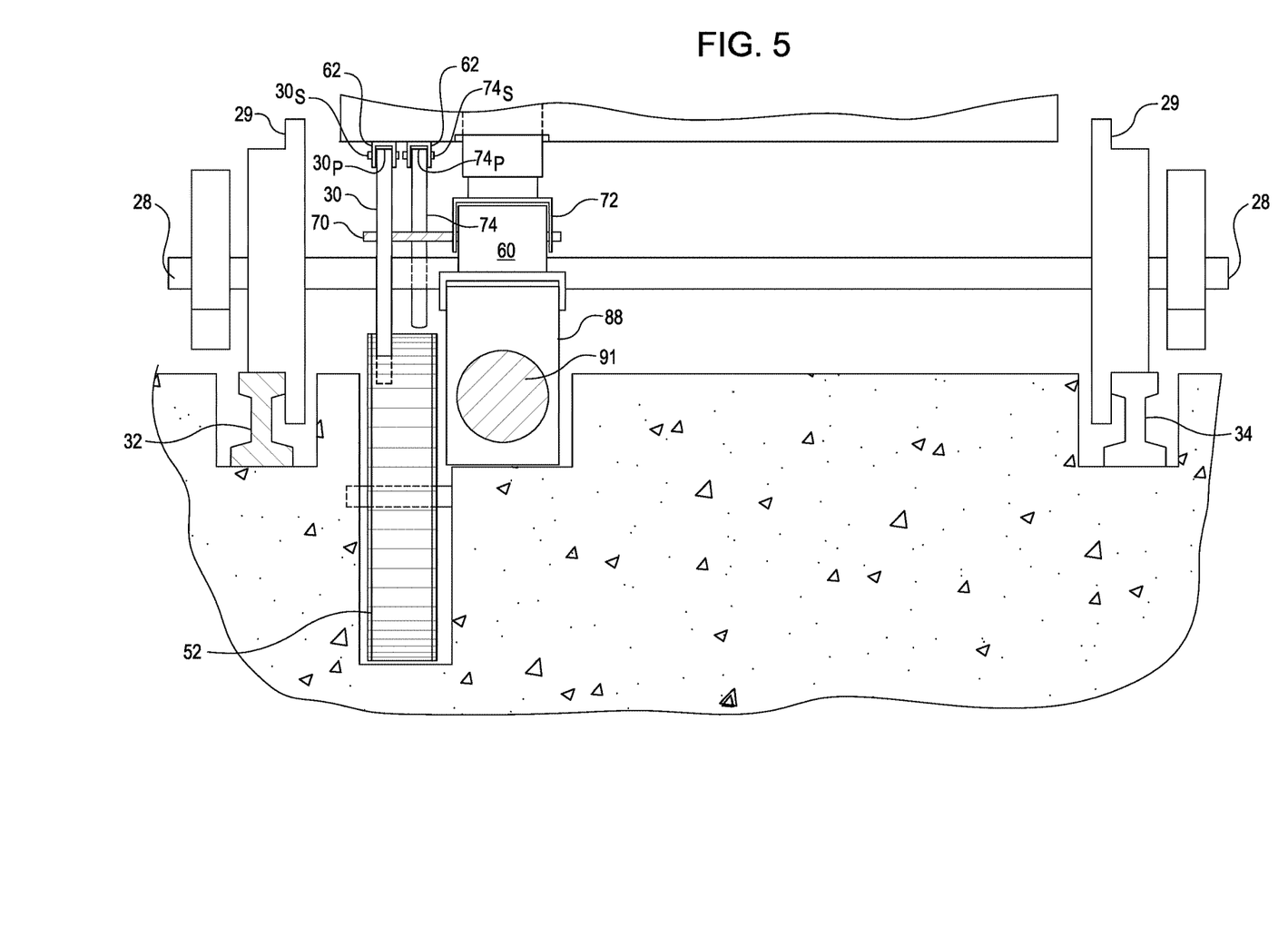
FIG. 5 is a partial conceptual vertical cross-sectional view, showing some elements of an embodiment for a drag chain conveyor in combination with first and second conveyor hooks on a railroad car, and a guide roller for moving the conveyor hook, all as configured for interrupting the movement of a railroad car when traversing the railroad siding above the conveyor system, and the pivot board on which the guide roller moves, and below the pivot board, a pivot block with extension/retraction mechanism visible at the rear thereof.

As seen in FIG. 2, and in more detail in FIG. 5, at least one of the one or more conveyor hooks (30 and 74) includes a pivot end ($30_P$ and $74_P$, respectively) located at a pivot seat $30_S$ and $74_S$, respectively) in the hook mount 62, which is affixed to the frame 23 of the railroad car 20 for arcuate movement of the at least one of the one or more conveyor hooks (30, 74) below the frame 23. The up and down movement (see reference arrow 76 in FIG. 2) of the extensible guide roller 60 provides a range of angular movement of each of the one or more conveyor hooks (30, 74). As seen in FIGS. 2 and 7, the conveyor hooks (30, 74) extend from a pivot end ($30_P$ and $74_P$) to a distal end ($30_D$, $74_D$). Each of the conveyor hooks (30, 74) further includes, at and near their distal ends ($30_D$, $74_D$), a hook portion (64, 64).

As depicted in FIG. 3, in an embodiment the pair of spaced apart rails (32, 34) forming railroad siding 36 maybe located adjacent a wharf 38 which is adapted to receive a ship 150 transporting shipping containers 22. The apparatus may further include a crane 40 which is adjustably positionable on the wharf 38 for removing shipping containers 22 one at a time from the ship 150 and placing them on the railroad cars 20, while the railroad cars 20 are located above the chain conveyor 50.

In an embodiment, a method for transfer of shipping containers 22 from ship 150 to railroad cars 20 may be provided, for transport of shipping containers 22 via railroad. In an embodiment, such a method may include providing at least one conveyor hook (30, 74) equipped railroad car 20. A suitable conveyor hook (30, 74) equipped railroad car 20 may include a frame 23 disposed between a first bogie 24 and a second bogie 26. In an embodiment, the frame 23 may further include an extensible guide roller 60, which may be mounted below the frame 23 for extension up and down therebelow, as indicated by reference arrow 76 in FIG. 2. In an embodiment, first and second conveyor hooks (30, 74) may be provided, and the first and second conveyor hooks (30, 74) may be pivotally mounted for angular motion below the frame 23. The extensible guide roller 60 may further include an outwardly projecting hook guide 70, which may be mounted to a housing 72 for the extensible guide roller 60. In an embodiment, the first and second conveyor hooks (30, 74) may be pivotally mounted so as to be supported by the outwardly projecting hook guide 70. A first railroad siding 36 may be provided adjacent a source of shipping containers 22. The first railroad siding 36 may include a spaced apart pair of rails (32, 74), which are connected to a railroad system (not shown). A conveyor system 50 may be provided, having a having a first end $50_1$ and a second end $50_2$. A drag chain 52 is provided moving railroad cars 20 from the first end $50_1$ to the second end $50_2$ of the conveyor system 50. In order to load a shipping container 22 on a railroad car 20, one of a plurality of railroad cars 20 is moved to a loading position, as indicated in FIG. 3, adjacent a source of shipping containers such as a ship 150, by engaging a conveyor hook 30 and/or 74 on the railroad car 20 to the drag chain 52. The, when the guide roller 60 on the railroad car urges the conveyor hook (30, 74) upwardly sufficiently to disengage the conveyor hook (30, 74) from the drag chain 52, the movement of the railroad car 20 is halted. At that point, a crane 40 is used to lift a selected shipping container 22 from the source of shipping containers (e.g. ship 150), and then the selected shipping container 22 is moved to and mounted on one of the plurality of railroad cars 20, either directly thereon as shown by shipping container 22C, or indirectly by way of mounting on a lower shipping container, as shown by shipping container 22D mounted on shipping container 22C in FIG. 6. In an embodiment, the step of mounting the selected shipping container 22 to one of the plurality of railroad cars 20 further includes supporting the first 30 and said second 74 conveyor hooks at a height above the drag chain 52 of the conveyor system 50 sufficient to allow the drag chain 52 to move without engaging the conveyor hook (30 and/or 74). In an embodiment, the method includes providing the upward movement of the conveyor hook (30, and/or 74) by way of the outwardly oriented bar 70 at the guide roller housing 72, as the drag chain 52 moves the selected one of the plurality of railcar 20. In an embodiment, the method further includes, during the step of mounting the selected shipping container 22 to one of the plurality of railroad cars 20, supporting the guide roller 60 above the pivot board 82, which is in turn supported by the pivot stop 88, so as to disengage the conveyor hook (30, and/or 74) from the drag chain 52. After shipping container 22C (and shipping container 22D, if present) are secured, the conveyor hook (30 and/or 74) is reengaged with the drag chain 52 to move the railroad car 20 to the second end $50_2$ of the conveyor system 50. In an embodiment, the step of reengaging the conveyor hook (30 and/or 74) is accomplished by moving the pivot stop 88 so as to remove support for the pivot board 82, to thereby allow the conveyor hook (30 and/or 74) to reengage the drag chain 52.

In an embodiment, a unique railroad car 20 is provided. As noted above, the railroad car 20 may include a first bogie 24 and a second bogie 26. In an embodiment, each bogie (24, 26) may include a chassis operably supporting at least four flanged main rail wheels 29, and wherein the bogie (24, 26) includes a suspension package between the four flanged main rail wheels 29 and the bogie chassis. The railroad car 20 further includes a frame 23 which includes a first end $20_1$ and a second end $20_2$, and wherein the frame is pivotally supported above and between the first bogie 24 and the second bogie 26. A first conveyor hook 30 is pivotally affixed to the frame 23 for angular movement therebelow. In an embodiment, a second conveyor hook 74 may be pivotally affixed to the frame 23 for angular movement therebelow. A guide roller 60 is mounted for extensible-retractable up and down movement below the frame 23. The guide roller 60 is rotatably secured by housing 72, which may be provided with an outwardly extending hook guide 70. In an embodiment, the hook guide 70 may be in the form of a cylindrical bar. In an embodiment, the hook guide 70 may extend horizontally outwardly from the housing 72. The first conveyor hook 30 and the second conveyor hook 74 are pivotally mounted (a) for support by the outwardly extending hook guide 70, and (b) for up and down movement in response to up and down movement of the outwardly extending hook guide 70.

In an embodiment, a railroad car 20 may be a well type car. The well type railroad car 20 may include a frame 23 shaped and sized to allow loading and carriage of a first 22C and a second 22D standard height shipping container, when the second 22D standard height shipping container is mounted on the first 22C standard height shipping container.

The apparatus and method described above is expected to be useful in reducing the time and labor requirements for loading shipping containers 22 on to railroad cars 20 in intermodal ship-to-rail shipments. In an embodiment of the method, at the end of the conveyor system 50, a train assembly area may be provided, where a first one of a selected plurality of railroad cars 20 is connected to other railroad cars 20. In a variation and refinement of the method, the source of shipping containers may be organized by destination, and in such cases, shipping containers 22 may be loaded to railroad cars 20 in groups by destination. In an embodiment, a group of railroad cars 20 in a selected plurality of railroad cars 20 may be provided for each destination, to facilitate separation at distribution yards after transshipment on main railroad lines is complete.

In the foregoing description, numerous details have been set forth in order to provide a thorough understanding of the disclosed exemplary embodiments for apparatus and method for moving shipping containers, and methods of their use in railroad intermodal freight systems. However, certain of the described details may not be required in order to provide useful embodiments, or to practice selected or other disclosed embodiments. Further, the description may include, for descriptive purposes, various relative terms such as surface, at, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various components are described which may be employed alternatively, yet be included in some designs or components for use in a particular situation. Accordingly, the method(s) described herein may be utilized in whole or in part in various discrete operations, in a manner that is most helpful in a particular circumstance. However, the order of description should not be construed as to imply that such alternatives are necessarily order dependent, or that use of various components is necessarily in the alternative. Also, the reader will note that the phrase "in one embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by this invention, and may be embodied in other specific forms without departing from the spirit or essential characteristics thereof. Embodiments presented herein are to be considered in all respects as illustrative and not restrictive or limiting. This disclosure is intended to cover methods and apparatus described herein, and not only structural equivalents thereof, but also equivalent structures. Modifications and variations are possible in light of the above teachings. Therefore, the protection afforded to this invention should be limited only by the claims set forth herein, and the legal equivalents thereof.

The invention claimed is:

1. A method for transfer of shipping containers from ship to rail, for transport via railroad, comprising:
    providing at least one hook equipped railroad car, said hook equipped railroad car comprising a frame disposed between a first bogie and a second bogie, said frame further comprising an extensible guide roller, said extensible guide roller mounted below said frame for extension up and down therebelow, and first and second conveyor hooks, said first and second conveyor hooks pivotally mounted for angular motion below said frame, and wherein said extensible guide roller further comprises a housing having an outwardly projecting hook guide, said first and second conveyor hooks pivotally mounted so as to be supported by said outwardly projecting hook guide;
    providing a first rail siding, said first rail siding located adjacent a source of shipping containers, said first rail siding comprising a spaced apart pair of rails connected to a railroad system;
    providing a conveyor system, said conveyor system having a first end and a second end, and a drag chain for moving railroad cars from said first end to said second end, and a pivot, a pivot board pivotally mounted to said pivot, and a pivot stop, said pivot stop adjustably positionable between a support position wherein it supports said pivot board, and a position in which the pivot board is not supported;
    moving said at least one hook equipped railroad car to a loading position adjacent said source of shipping containers by engaging a conveyor hook on said railroad car to said drag chain;
    disengaging said conveyor hook from said drag chain to halt movement of said railroad car;
    lifting a selected shipping container from said source of shipping containers, and then lowering said selected shipping container and mounting said selected shipping container to one of said plurality of railroad cars; and
    reengaging said conveyor hook with said drag chain to move said rail car to said second end of said conveyor system.

2. The method as set forth in claim 1, wherein said first rail siding is located on a wharf, and wherein said source of shipping containers is a ship.

3. The method as set forth in claim 1, wherein the step of disengaging said conveyor hook from said drag chain comprises lifting a conveyor hook on said rail car sufficiently so as to disengage said conveyor hook from said drag chain.

4. The method as set forth in claim 1, wherein during the step of mounting said selected shipping container to at least one hook equipped railroad car further comprises supporting said first and said second conveyor hooks at a height above said drag chain of said conveyor sufficient to allow said drag chain to move without engaging said conveyor hook.

5. The method as set forth in claim 4, wherein said upward movement of said conveyor hook is provided by said outwardly projecting hook guide, as said drag chain moves at least one hook equipped railroad car.

6. The method as set forth in claim 5, wherein after loading of said shipping container on said at least one hook equipped railroad car, the method further comprises moving said pivot stop so as to remove support for said pivot board, to thereby allow said conveyor hook to reengage said drag chain.

7. The method as set forth in claim 6, wherein during the step of mounting said selected shipping container to said at least one hook equipped railroad, said guide roller is supported above said pivot board, which is supported by a pivot stop, so as to disengage said conveyor hook from said drag chain.

\* \* \* \* \*